(12) United States Patent
Stoicoviciu et al.

(10) Patent No.: US 8,167,772 B2
(45) Date of Patent: May 1, 2012

(54) SYSTEMS AND METHODS FOR CONVERTING A GASOLINE-FUELED VEHICLE TO A DUAL-MODE POWERED VEHICLE

(75) Inventors: Laurian Stoicoviciu, Kyle, TX (US); Spencer Sharp, Austin, TX (US)

(73) Assignee: Blue Wheel Technologies, Inc., Kyle, TX (US)

( * ) Notice: Subject to any disclaimer, the term of this patent is extended or adjusted under 35 U.S.C. 154(b) by 0 days.

(21) Appl. No.: 13/188,110

(22) Filed: Jul. 21, 2011

(65) Prior Publication Data
US 2011/0278126 A1    Nov. 17, 2011

Related U.S. Application Data

(63) Continuation of application No. PCT/US2011/043933, filed on Jul. 14, 2011.

(60) Provisional application No. 61/399,665, filed on Jul. 15, 2010, provisional application No. 61/488,048, filed on May 19, 2011.

(51) Int. Cl.
*B60W 10/02* (2006.01)
*B60W 10/06* (2006.01)
*B60W 10/08* (2006.01)

(52) U.S. Cl. ............................................. 477/5
(58) Field of Classification Search ........... 477/5
See application file for complete search history.

(56) References Cited

U.S. PATENT DOCUMENTS

| | | | |
|---|---|---|---|
| 461,057 A | 10/1891 | Shover et al. | |
| 874,411 A | 12/1907 | Leblanc | |
| 3,637,956 A | 1/1972 | Blackman | 191/4 |
| 3,914,562 A | 10/1975 | Bolger | 191/10 |
| 4,007,817 A | 2/1977 | Bolger, Jr. | 191/10 |
| 4,092,554 A | 5/1978 | Quinn | 104/292 |
| 4,139,071 A | 2/1979 | Tackett | 180/2 R |
| 4,331,225 A | 5/1982 | Bolger | 191/10 |
| 4,476,947 A | 10/1984 | Rynbrandt | 180/2.1 |
| 4,602,694 A | 7/1986 | Weldin | 180/2.2 |
| 4,800,328 A | 1/1989 | Bolger et al. | 320/2 |
| 5,045,646 A | 9/1991 | Musachio | 191/6 |
| 5,311,973 A | 5/1994 | Tseng et al. | 191/10 |
| 5,431,264 A | 7/1995 | Tseng et al. | 191/10 |
| 5,573,090 A | 11/1996 | Ross | 191/10 |
| 5,595,271 A | 1/1997 | Tseng | 191/4 |
| 5,680,907 A | 10/1997 | Weihe | 180/2.2 |
| 5,821,728 A | 10/1998 | Schwind | 320/108 |
| 5,921,334 A | 7/1999 | Al-Dokhi | 180/2.2 |

(Continued)

OTHER PUBLICATIONS www.physorg.com ; "Cable-free charging of electric cars via coils"; pp. 2, Apr. 11, 2011.

(Continued)

*Primary Examiner* — Edwin A Young
(74) *Attorney, Agent, or Firm* — Baker Botts L.L.P.

(57) ABSTRACT

A system and method for powering of a vehicle is disclosed. In accordance with embodiments of the present disclosure, a powering assembly may include an axle, a wheel coupled to the axle, and at least one secondary coil winding affixed to the wheel. The wheel may be configured to rotate about the axle in a plane substantially perpendicular to an axis of the axle. The at least one secondary coil may be configured such that when the wheel is proximate to an embedded conductor embedded in a roadway and carrying a first electrical current, a magnetic field induced by the first electrical current induces a second electrical current in the at least one secondary coil winding.

11 Claims, 7 Drawing Sheets

U.S. PATENT DOCUMENTS

| | | | | |
|---|---|---|---|---|
| 6,376,927 | B1 | 4/2002 | Tamai et al. | 290/40 C |
| 6,879,889 | B2 | 4/2005 | Ross | 701/22 |
| 7,451,839 | B2 | 11/2008 | Perlman | 180/2.1 |
| 2003/0200025 | A1 | 10/2003 | Ross | 701/200 |
| 2005/0199282 | A1 | 9/2005 | Oleinick et al. | 136/256 |
| 2007/0020047 | A1 | 1/2007 | Adair | 404/71 |
| 2007/0131505 | A1 | 6/2007 | Kim | 191/14 |
| 2007/0276556 | A1 | 11/2007 | Noel et al. | 701/22 |
| 2008/0121481 | A1 | 5/2008 | Mitsuhashi et al. | 191/10 |
| 2009/0009131 | A1 | 1/2009 | Kissel, Jr. | 320/104 |
| 2009/0032350 | A1 | 2/2009 | Shapery | 191/10 |
| 2009/0038902 | A1 | 2/2009 | Yechuri | 191/48 |
| 2009/0045773 | A1 | 2/2009 | Pandya et al. | 320/108 |
| 2009/0267348 | A1 | 10/2009 | Liebermann | 290/45 |
| 2010/0045111 | A1 | 2/2010 | Abramovich et al. | 307/43 |
| 2010/0154855 | A1 | 6/2010 | Nemir et al. | 136/205 |
| 2010/0197450 | A1* | 8/2010 | Mittelberger et al. | 477/5 |
| 2010/0312427 | A1* | 12/2010 | Ueno | 701/22 |
| 2011/0031047 | A1 | 2/2011 | Tarr | 180/65.1 |

OTHER PUBLICATIONS www.physorg.com ; "Electric cars get charged wirelessly in London"; pp. 1, Nov. 4, 2010.
www.physorg.com ; "Don't coil it, pour it"; pp. 1, Mar. 31, 2011.
www.physorg.com ; "Scientists make magnetic new graphene discovery"; pp. 1, Apr. 14, 2011.
www.physorg.com ; "New spin on graphene"; pp. 1, Apr. 14, 2011.
www.physorg.com ; "Polish team claims leap for wonder material graphene"; pp. 2, Apr. 8, 2011.
www.sciencedaily.com ; "Nanoparticles Improve Solar Collection Efficiency"; pp. 2, Apr. 5, 2011.
www.sciencedaily.com ; "Solar Power Goes Viral: Researchers Use Virus to Improve Solar-Cell Efficiency"; pp. 3, Apr. 26, 2011.
www.physorg.com ; "Thermoelectric materials: recycling energy"; pp. 1, Mar. 31, 2011.
www.physorg.com ; "Recylcing waste heat into energy: Researchers take a step toward more efficient conversion"; pp. 2, Dec. 22, 2010.
www.physorg.com ; "Breakthrough in converting heat waste to electricity"; pp. 1, Jan. 18, 2011.
www.physorg.com ; "Power cables light the future path of superconductivity"; pp. 1, Apr. 1, 2011.
www.eurekalert.org ; "Self-cooling observed in graphene electronics"; pp. 2, Apr. 3, 2011.
www.physorg.com ; "SIM-Drive Corp announces new 'in-wheel' electric car"; pp. 3, Apr. 1, 2011.
www.physorg.com ; "New material provides 25 percent greater thermoelectric conversion efficiency"; pp. 3, Feb. 15, 2011.
www.physorg.com ; "Enhancing the magnetism"; pp. 3, Mar. 18, 2011.
www.physorg.com ; "Researchers take the lead out of piezoelectrics"; pp. 1, Nov. 13, 2009.
www.physorg.com ; "Conducting ferroelectrics may be key to new electronic memory"; pp. 2, Apr. 25, 2011.
www.physorg.com ; "Electric Switches Hold Promise for Data Storage"; pp. 1, May 22, 2009.
www.physorg.com ; "Domain walls that conduct electricity"; pp. 4, Jan. 29, 2009.
www.physorg.com "Researchers control conduction, surface states in topological insulator nanoribbons"; pp. 2, Feb. 14, 2011.
www.physorg.com ; "The physics of a sustainable society revolution"; pp. 1, Feb. 14, 2011.
www.sciencedaily.com ; "New Technology for Cheaper, More Efficient Solar Cells"; pp. 3, Feb. 21, 2011.
www.physorg.com ; "Higher energy yield with torque vectoring gears"; pp. 1, Feb. 23, 2011.
http://pesn.com; "PEMM Motor Harnesses Anti-Matter and Ekectron-Avalanche"; pp. 7, Mar. 22, 2011.
www.sciencedaily.com ; "Templated Growth Technique Produces Graphene Nanoribbons With Metallic Properties"; pp. 3, Mar. 22, 2011.
www.sciencedaily.com ; "Room-Temperature Spintronic Computers Coming Soon? Silicon Transistors Heat Up and Spins Last Longer"; pp. 4, Mar. 16, 2011.
www.physorg.com ; "Solar power without solar cells: A hidden magnetic effect of light could make it possible"; pp. 1, Apr. 14, 2011.
www.physorg.com ; "Toward a more efficient use of solar energy"; pp. 2, Apr. 14, 2011.
www.physorg.com ; "Fridge magnet transformed"; pp. 2, Mar. 11, 2011.
www.sciencedaily.com ; "Probing Atomic Chicken Wire: Mounting Graphene on Boron Nitride Dramatically Improves Electronic Properties"; pp. 4, Mar. 7, 2011.
www.physorg.com ; "Predicting when, how spins of electrons arrange in one-dimensional multiferroic materials"; pp. 1, Mar. 4, 2011.
www.technologyreview.com ; "A Way to Make the Smart Grid Smarter"; pp. 2, Dec. 22, 2010.
www.kurzweilai.net ; "New transistors: An alternative to silicon and better than graphene"; pp. 2, Jan. 31, 2011.
www.newscientist.com ; "Road train technology can drive your car for you"; pp. 2, Jan. 18, 2011.
www.kurzweilai.net ; "Nanosheets generated by ultrasonic pulses allow new designs of computing devices, sensors, batteries"; pp. 2, Feb. 7, 2011.
www.physorg.com ; "Solar goes Hyper in the U.S."; pp. 1, Feb. 21, 2011.
www.physorg.com ; "Physicists control light scattering in graphene"; pp. 4, Mar. 16, 2011.
International Search Report and Written Opinion; PCT/US2011/043933; pp. 15, Nov. 21, 2011.

* cited by examiner

SYSTEMS AND METHODS FOR CONVERTING A GASOLINE-FUELED VEHICLE TO A DUAL-MODE POWERED VEHICLE

RELATED APPLICATIONS

This application is a continuation application of International Application Number PCT/US11/43933 filed Jul. 14, 2011; which claims the benefit of U.S. provisional application No. 61/399,665 filed Jul. 15, 2010, and also claims the benefit of U.S. provisional application No. 61/488,048 filed May 19, 2011, the contents of which are hereby incorporated by reference in its entirety.

This application is also copending with U.S. patent application Ser. No. 13/188,010, filed Jul. 21, 2011, entitled "Systems and Methods for Powering a Vehicle."

TECHNICAL FIELD

The present invention relates generally to powering of motor vehicles, and more particularly to powering of a vehicle from a roadway-embedded conductor using magnetic induction and electric conduction.

BACKGROUND

Due to increased environmental consciousness and political and economic concerns associated with the importation of foreign petroleum products, electric vehicles have been considered as alternatives to traditional internal combustion engine vehicles. However, significant transition from use of internal combustion engine vehicles to electric vehicles or hybrid electric/combustion engine vehicles has not been realized due to numerous challenges and disadvantages.

For example, an existing challenge is the relatively short range of electric vehicles utilizing batteries coupled with battery recharge times that may be significantly larger than the usage time of the battery. This shortcoming has been addressed by various approaches employing magnetic induction (also known as inductive coupling) to power vehicles and/or charge vehicle batteries.

To achieve inductive coupling of energy between physically separate elements, a primary coil may be electrically coupled to a current source such that the flow of current through the primary coil induces a magnetic field surrounding the primary coil. Current may be induced in a secondary coil when turns of the secondary coil cut through imaginary lines of flux of the magnetic field. The turns of the secondary coil may be caused to cut through magnetic lines of flux by producing relative motion between the primary and secondary coils and/or by causing the magnetic field to fluctuate using an alternating current source coupled to the primary coil.

In vehicles, magnetic induction powering has been proposed by providing a primary coil that is embedded in or near a roadway or path of vehicle travel and by affixing a secondary coil to the vehicle, such that the secondary coil moves with the vehicle, thereby producing relative motion between the primary and secondary coils. Presently, induction powering systems have been deployed only for charging stationary vehicles (e.g., in parking areas). However, such traditional approaches of applying magnetic induction powering are not without shortcomings.

As an example, one shortcoming is the distance between the primary coil and the secondary coil in traditional approaches. To provide clearance of the secondary coil from debris and other roadway hazards, traditional approaches provide an air gap between the roadway (having the primary coil) and a pick-up unit carrying the secondary coil. Such an air gap may reduce the effectiveness of magnetic induction, as inductive coupling between two coils decreases as the distance between the coils increases. A similar shortcoming is that traditional approaches do not ensure lateral alignment between the primary coil and the secondary coil. Due to such shortcoming, some vehicles, particularly those vehicles steered by a person, may stray from a centerline of a roadway, thereby reducing the inductive coupling between the primary and secondary coils. Additionally, another shortcoming of approaches pre-dating this disclosure is that the distance between the pavement and the secondary may continuously vary on a vehicle in motion due to horizontal motion of a vehicle in motion generated by the non-uniformity of pavement and the response of vehicle shock and struts.

As another example, the relative motion between a primary coil embedded in a roadway and a secondary coil mounted to a vehicle may not be sufficient to induce a sufficient amount of current in the secondary coil. While the current induced in the secondary coil may be increased by utilizing high-frequency alternating current in the primary coil, the resulting induced current may still remain insufficient to provide the necessary power or charging.

In addition, proposed methods to providing powering to a vehicle from a roadway may expose humans and other animals to high-frequency currents which may pose health and safety concerns.

SUMMARY

In accordance with the present disclosure, the disadvantages and problems associated with prior systems and methods for powering a vehicle have been substantially reduced or eliminated.

In accordance with embodiments of the present disclosure, a powering assembly may include an axle, a wheel coupled to the axle, and at least one secondary coil winding affixed to the wheel. The wheel may be configured to rotate about the axle in a plane substantially perpendicular to an axis of the axle. The at least one secondary coil may be configured such that when the wheel is proximate to an embedded conductor embedded in a roadway and carrying a first electrical current, a magnetic field induced by the first electrical current induces a second electrical current in the at least one secondary coil winding.

In accordance with further embodiments of the present disclosure, a vehicle may include a chassis and a powering assembly mechanically coupled to the chassis. The powering assembly may include an axle, a wheel coupled to the axle, and at least one secondary coil winding affixed to the wheel. The wheel may be configured to rotate about the axle in a plane substantially perpendicular to an axis of the axle. The at least one secondary coil may be configured such that when the wheel is proximate to an embedded conductor embedded in a roadway and carrying a first electrical current, a magnetic field induced by the first electrical current induces a second electrical current in the at least one secondary coil winding.

In accordance with additional embodiments of the present disclosure, a method for powering a vehicle may include coupling a wheel to an axle such that the wheel rotates about the axle in a plane substantially perpendicular to an axis of the axle. The method may also include affixing at least one secondary coil winding to the wheel such that when the wheel is proximate to an embedded conductor embedded in a roadway and carrying a first electrical current, a magnetic field induced by the first electrical current induces a second electrical current in the at least one secondary coil winding.

In accordance with other embodiments of the present disclosure, a method for adapting a conventional gasoline-powered vehicle to permit the vehicle to be powered via a roadway-embedded conductor may include mechanically coupling a first clutch between an internal combustion engine transmission of the vehicle and a drive train of the vehicle, the first clutch configured to engage the internal combustion engine with the drive train during a first mode of operation and disengage the internal combustion engine from the drive train during a second mode of operation. The method may also include mechanically coupling a second clutch to the drive train and mechanically coupling an electric motor to a second clutch, the second clutch configured to engage the electric motor with the drive train during the second mode of operation and disengage the electric motor from the drive train during the first mode of operation. The method may further comprise electrically coupling the electric motor to at least one of: (i) a powering assembly configured to transfer at least a portion of electrical energy from a roadway-embedded conductor, the electrical energy in the form of at least one of a magnetically-induced electric current and an electrically-conducted current; and (ii) an energy storage device configured to convert at least a portion of the electrical energy transferred by the powering assembly into stored potential energy.

In accordance with other embodiments of the present disclosure, a system for adapting a conventional gasoline-powered vehicle to permit the vehicle to be powered via a roadway-embedded conductor may include a powering assembly, an electric motor, a first clutch, and a second clutch. The powering assembly may be configured to transfer electrical energy from a roadway-embedded conductor, the electrical energy in the form of at least one of a magnetically-induced electric current and an electrically-conducted current. The electric motor may be configured to be powered by at least one of a portion of the electrical energy transferred by the powering assembly and stored potential energy converted from at least a portion of the electrical energy transferred by the powering assembly. The first clutch may be configured to be mechanically coupled to an internal combustion engine transmission of the vehicle and a drive train of the vehicle, the first clutch further configured to engage the internal combustion engine with the drive train during a first mode of operation and disengage the internal combustion engine from the drive train during a second mode of operation. The second clutch may be configured to be mechanically coupled to the electric motor, the second clutch further configured to engage the electric motor with the drive train during the second mode of operation and disengage the electric motor from the drive train during the first mode of operation.

BRIEF DESCRIPTION OF THE DRAWINGS

For a more complete understanding of the present invention and its advantages, reference is now made to the following description taken in conjunction with the accompanying drawings, in which.

DETAILED DESCRIPTION

Figure 1:
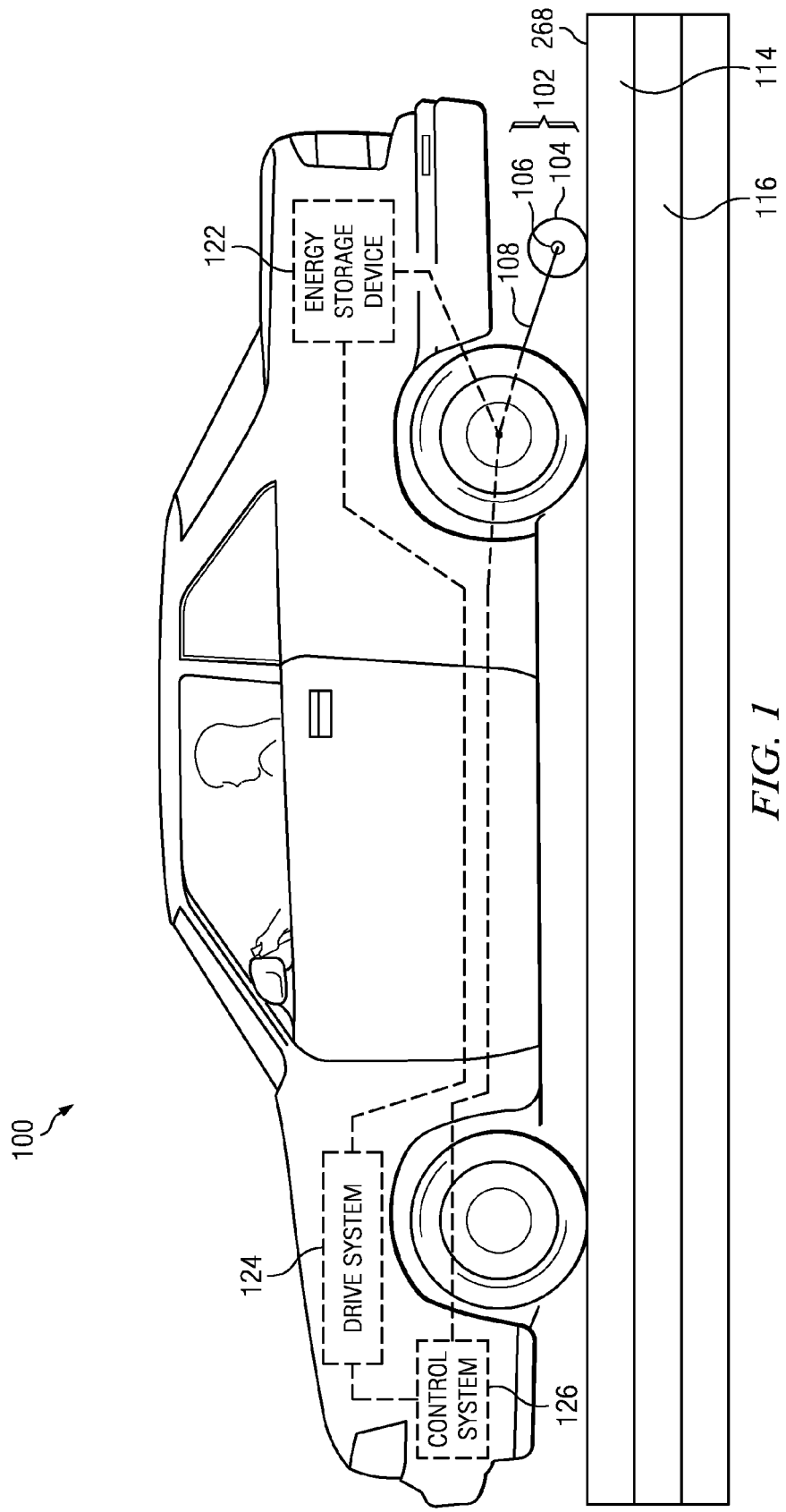
FIG. 1 illustrates a vehicle with a powering assembly and a roadway for providing an electric current for induction powering, in accordance with embodiments of the present disclosure.

FIG. 1 illustrates a vehicle 100 with a powering assembly 102, in accordance with particular embodiments of the present disclosure. Although vehicle 100 depicted in FIG. 1 is a passenger automobile, vehicle 100 may broadly represent any system, device, or apparatus configured or used to transport persons and/or cargo in whole or in part on land, including without limitation a passenger automobile (e.g., a car, truck, sport utility vehicle, van, bus, motorcycle, coach, etc.), a train, a trolley, an aircraft, a spacecraft, an amphibious watercraft, industrial equipment (e.g., a forklift, cart, etc.), and/or any other suitable vehicle. As depicted in FIG. 1, vehicle 100 may include powering assembly 102. Powering assembly 102 may comprise a system, device, or apparatus configured to generate electrical energy via magnetic induction, and transmit such generated energy to one or more energy storage devices 122 (e.g., one or more rechargeable batteries and/or super-capacitors) disposed in and/or affixed to vehicle 100, and/or transmit such generated energy to a drive system 124 of vehicle 100 (e.g., one or more components, including without limitation an engine, a motor, a drive train, axles, pulleys, and wheels, configured to convert electrical and/or chemical energy into mechanical energy to propel vehicle 100). Example structure, function, and selected components of powering assembly 102 are described in greater detail below with respect to FIGS. 2A-2C and 3.

To generate electric energy via magnetic induction, powering assembly 102 may be configured to travel upon a roadway 114 having an embedded conductor 116. Although roadway 114 is depicted in FIG. 1 as a roadway adapted for use by passenger automobiles, roadway 114 may broadly represent any roadway configured for use by any vehicle, including without limitation a road, street, freeway, highway, bridge, runway, tarmac, rail, dock, warehouse floor, building hallway floor, and/or any other suitable surface upon which a vehicle 100 may travel. Embedded conductor 116 may embedded beneath the surface of roadway 114 and may include any material suitable for conducting an electric current. In addition, embedded conductor 116 may be electrically coupled to a power source configured to generate an electric current in embedded conductor 116. Example structure, function, and selected components of roadway 114 are described in greater detail below with respect to FIGS. 2A-2D.

Figure 2A:
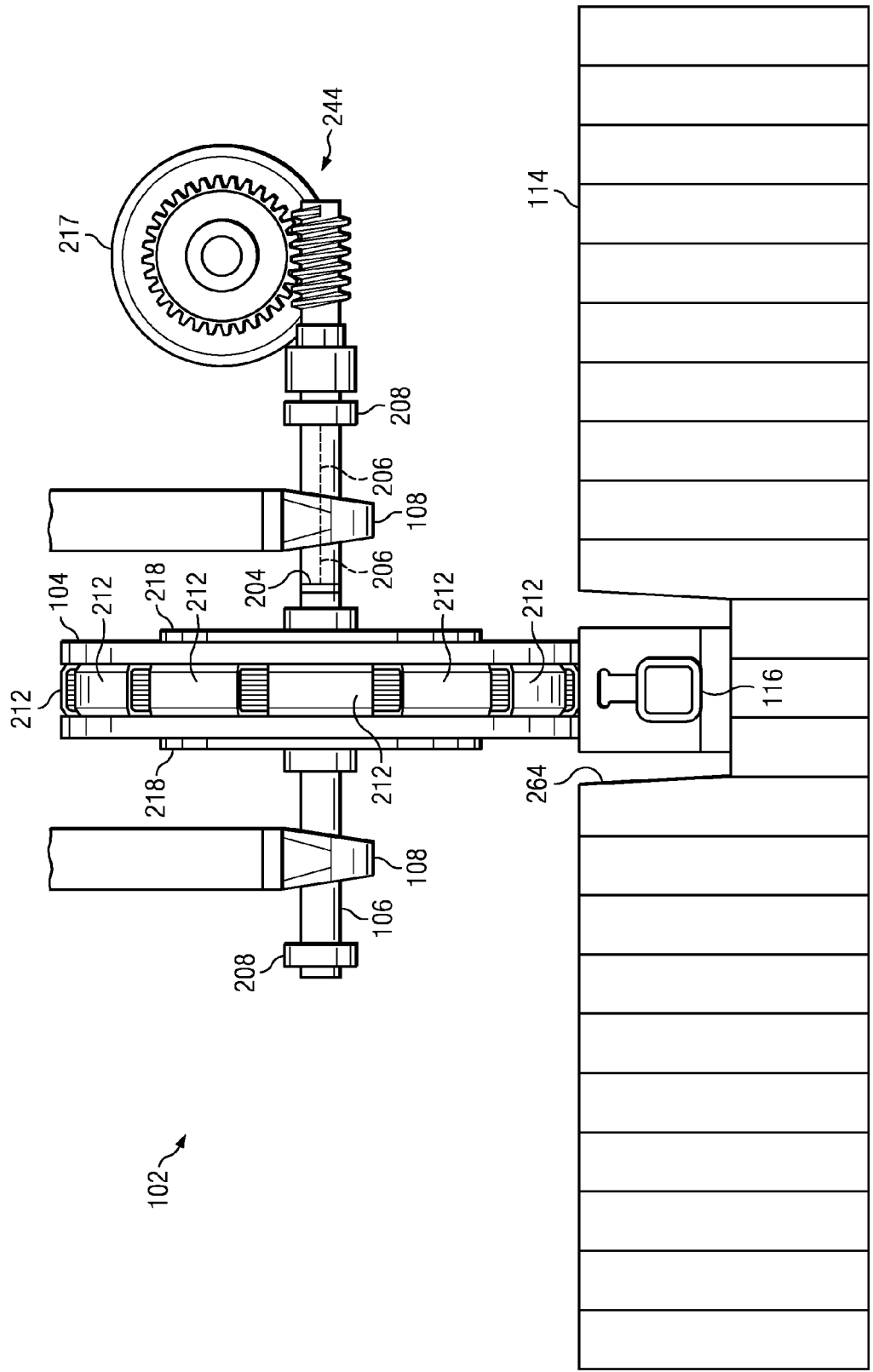
FIGS. 2A-2D illustrate selected components of a powering assembly and a roadway, in accordance with embodiments of the present disclosure.
Figure 2B:
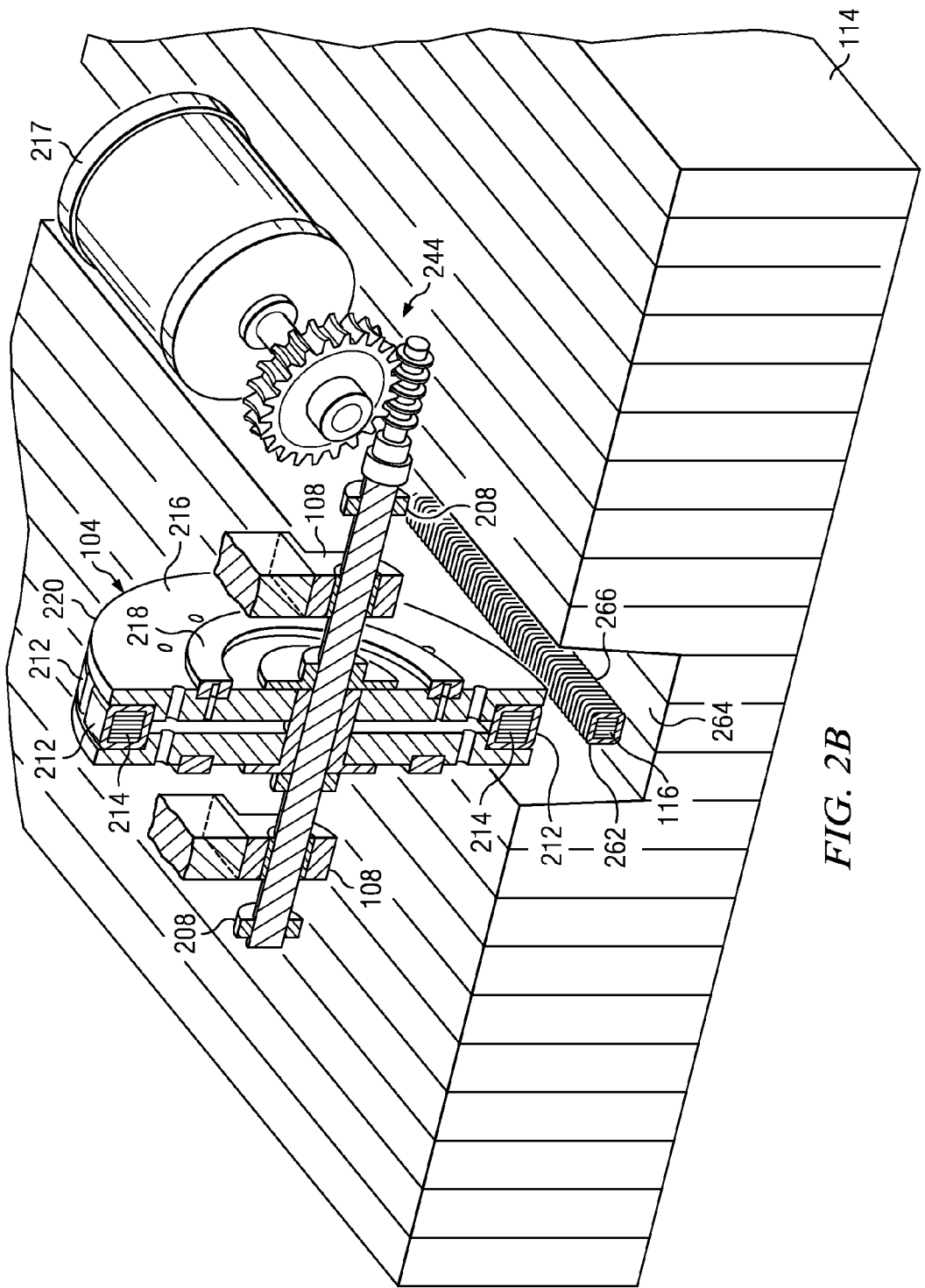
Figure 2C:
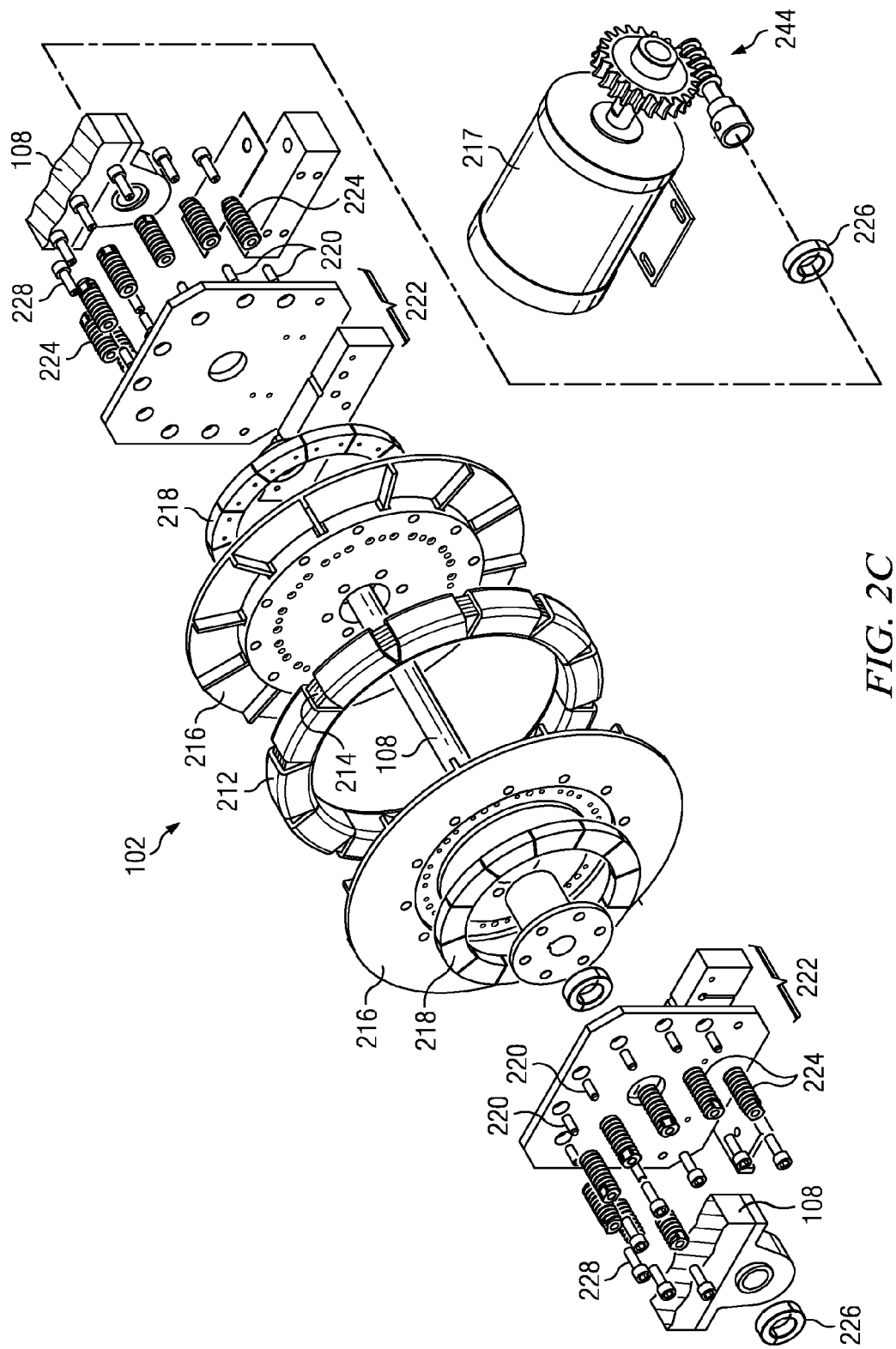

As shown in FIG. 1, and in greater detail in FIGS. 2A-2C, powering assembly 102 may include wheel assembly 104, axle 106, and one or more arms 108. As described in greater detail below with respect to FIGS. 2A-2C, wheel assembly 104 may include one or more coil windings (e.g., coils 212 depicted in FIGS. 2A-2C) electrically coupled to energy storage device 122, drive system 124, and/or other components of vehicle 100 and may be configured to rotate about axle 106 and proximate to embedded conductor 116 such that the one or more of the coil windings cut through a magnetic field generated by an electrical current in embedded conductor 116, thus inducing an electrical current in the one or more coil windings which may recharge energy storage device 122 and/or provide energy to drive system 124 for operation of vehicle 100. In addition or alternatively, such coil windings may be configured to receive electrical energy from embedded conductor 116 via electric conduction via roadway 114, as described in greater detail below.

Axle 106 may comprise any suitable shaft for wheel assembly 104. Axle 106 may be configured with appropriate bearings, bushings, and mounting points for wheel assembly 104 such that, during rotation of wheel assembly 104, axle 106 may remain in a substantially fixed position relative to wheel assembly 104.

An arm 108 may include any suitable structural member configured to mechanically couple powering assembly 102 to the remainder of vehicle 100 (e.g., the frame or chassis of the vehicle). For example, in the embodiment depicted in FIG. 1, an arm 108 may be coupled to a rear axle of vehicle 100 via a bearing, bolt, fastener, and/or other suitable manner. In other embodiments, arm 108 may be coupled at one end to the undercarriage or other appropriate point of vehicle 100 via a bearing, bolt, fastener, weld, and/or other suitable manner. In addition, arm 108 may be coupled at another end to axle 106 via a bearing, bolt, fastener, weld, and/or other suitable manner thus mechanically coupling powering assembly 102 to the remainder of vehicle 100 in a desired manner.

Energy storage device 122 may be electrically coupled to powering assembly 102 and one or more other components of vehicle 100 and may include any device that may store potential energy which may be utilized to operate vehicle 100 and is capable of receiving and storing energy generated via magnetic induction by powering assembly 102. For example, energy storage device 122 may include a rechargeable electrochemical battery, a fuel cell, a flywheel, hydraulic accumulator, mechanical spring, supercapacitor, and/or any other element operable to store potential energy.

Drive system 124 may be electrically coupled to energy storage device 122 and/or powering assembly 102, and may include any collection of components and devices that, in the aggregate, convert electrical energy provided by energy storage device 122 and/or powering assembly 102, and/or chemical energy provided by a fuel (e.g., gasoline, ethanol, etc.) into mechanical energy for propelling vehicle 100. For example, drive system 124 may include one or more engines, motors, pulleys, belts, drivetrains, axles, wheels, and/or other suitable devices. In addition, although drive system 124 is generically depicted as being present in a particular part of vehicle 100 for purposes of clarity and simplicity of exposition, it is noted that components of drive system 124 may be located throughout vehicle 100.

Control system 126 may be electrically and/or communicatively coupled to drive system 124, energy storage device 122, powering assembly 102 (or components thereof), and/or one or more other components of vehicle 100 and may generally be operable to based on signals received from one or more components of vehicle 100, communicate control signals to one or more components of vehicle 100 to control operation of such one or more components and/or communicate signals to an operator of vehicle 100 (e.g., via a user interface in a cabin of vehicle 100).

As shown in FIG. 1, roadway 114 may include embedded conductor 116. Embedded conductor 116 may comprise any material suitable for conducting an electrical current, including without limitation copper, aluminum, superconductor material (e.g., doped copper oxide), and/or other suitable material. In some embodiments, embedded conductor 116 may include a one or more coil windings of conductive material (e.g., coil windings 266 depicted in FIGS. 2A and 2B) oriented in any suitable fashion such that embedded conductor 116 generates a magnetic field above the surface of roadway 114. In some embodiments, the one or more coil windings may be wound around a ferromagnetic material (e.g., iron) to improve magnetic flux of the generated magnetic field. In some embodiments, embedded conductor 116 may be embedded below the surface of roadway 114 such that the surface of roadway 114 may provide dielectric insulation from embedded conductor 116 in order to reduce or eliminate hazard created if embedded conductor 116 were otherwise exposed. In these and other embodiments, the protective layer the surface of roadway 114 above embedded conductor may have electrically conductive, or dual-mode electrically insulative/electrically conductive properties, so as to, in addition or alternative to creating a magnetic flux for inductive powering of a vehicle 100 upon roadway 114, embedded conductor 116 may also conduct electrical energy to vehicle 100 through roadway 114, as described in greater detail below.

In order to carry an electrical current embedded conductor 116 may be electrically coupled to a source of electromagnetic energy (e.g., a power plant, a generating station, and/or other suitable source). The electric current driven to embedded conductor 116 may be direct current or alternating current. In some embodiments, in order to increase the magnetic flux generated by embedded conductor 116 (and thus, the magnetically-induced current in windings of wheel assembly 104), the electric current driven in embedded conductor 116 may be an alternating current operating at a high frequency (e.g., 240 Hz-400 Hz, compared to 60 Hz commonly available from power plants and generating stations for residential and commercial use). Accordingly, in such embodiments, a frequency converter may be inserted between publicly-available source of energy and embedded conductor 116 in order to provide for such increased frequency, as described in greater detail below.

In some embodiments, embedded conductor 116 may include or be part of an electromagnetic strip comprising a series of inductive coils, as described in greater detail below. Such series of inductive coils may be wound around a ferromagnetic material (e.g., iron) and/or encased in an electrically insulated material (e.g., plastic or rubber) that may be embedded into roadway 114. In these and other embodiments, the electromagnetic strip may be constructed to be flexible, so as to permit handling and transportation on cable spools or a similar package. During application, the electromagnetic strip may be laid into a slot or channel created in roadway 114.

Figure 2D:
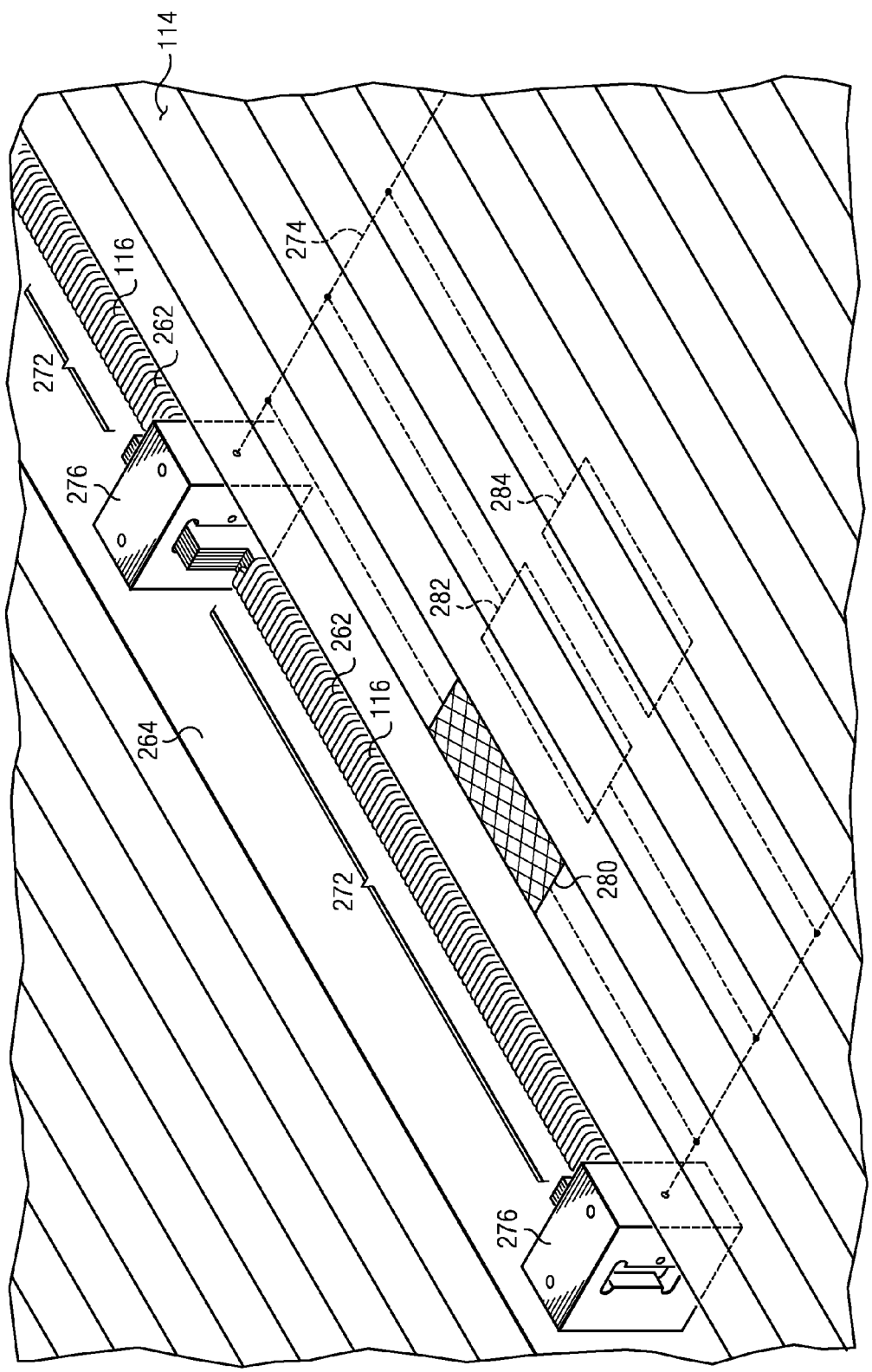

FIGS. 2A-2D illustrate selected components of powering assembly 102 and roadway 114, in accordance with particular embodiments of the present disclosure. FIG. 2A depicts an elevation view of powering assembly 102 and roadway 114, FIG. 2B depicts a cut-away perspective view of powering assembly 102 and roadway 114, FIG. 2C depicts an exploded view of powering assembly 102, and FIG. 2D depicts a cut-away perspective view of roadway 114.

As shown in FIGS. 2A and 2B, a channel 264 may be created in roadway 114, and embedded conductor 116 may be laid in such channel 264. Embedded conductor 116 may comprise a flexible electromagnetic strip, including a coil of conductive material 266 (e.g., wire constructed from copper, aluminum, or other conductive material) wrapped (e.g., in loops or turns) about a magnetic core 262 of ferromagnetic or ferrimagnetic material (e.g., iron, ferrite, iron silicide, etc.). In certain embodiments, flexibility of the flexible electromagnetic strip may be sufficient to permit handling and transportation by and on standard cable spools. As described below, segments 272 of embedded conductor 116 may be coupled to one or more switches (e.g., switch 404) to allow for individual powering of portions of embedded conductor 116. During construction of roadway 114, the electromagnetic strip of embedded conductor 116 may be laid into channel 264. After the strip is laid into channel 264, coil 266 may be electrically coupled to a source of electrical energy, such that embedded conductor 116 conducts electrical energy and generates a magnetic flux. A layer of protective asphalt or pavement may be applied on top of the electromagnetic strip, such as layer 268 depicted in FIG. 1. In the case of resurfacing of roadway 114, the electromagnetic strip may be extracted and reburied at the desired distance from the new surface. In some embodiments, the protective layer (e.g., layer 268) may have ferromagnetic properties (e.g., the asphalt or pavement comprising layer 268 may include particles of ferromagnetic material such as iron, for example). The presence of ferromagnetic properties in the protective layer may serve to increase magnetic flux generated above roadway 114 by electric current flowing in embedded conductor 116. In the same or alternative embodiments, channel 264 may be configured to optimize magnetic flux generated above roadway 114 by embedded conductor 116. For example, in some embodiments, channel 264 may be lined with a metallic material (e.g., aluminum, specially-designed materials with a wavelength corresponding to that of an electromagnetic wave present in embedded conductor 116, a Halbach array for creating a one-sided flux distribution, etc.). As so configured, such metallic material may serve to direct magnetic flux from channel 264 to above the surface of roadway 114. Alternatively or in addition, geometry of channel 264 may be configured to optimize magnetic flux. For example, channel 264 may have a parabolic shape which may also serve to direct magnetic flux from channel 264 to above the surface of roadway 114.

In some embodiments, a surface of roadway 114 substantially above embedded conductor 116 (e.g., layer 268), may include or be coated with one or materials to further guide magnetic flux lines and/or reduce random dispersion of the magnetic flux lines. For example, in such embodiments, a paint or other covering having ferromagnetic or ferrimagnetic properties may be applied to the surface of roadway 114 in the form of a strip substantially immediately above embedded conductor 116.

As described above, energy may be transferred from embedded conductor 116 to wheel assembly 104 via magnetic induction. However, in other embodiments, wheel assembly 104 and roadway 114 may be adapted to transfer energy via electric conduction. In such embodiments, the protective layer (e.g., layer 268) may have electrically insulative, electrically conductive, or dual-mode electrically insulative/electrically conductive properties. In many instances, it may be desirable that protective layer be electrically insulative, such that embedded conductor 116 does not become an electrical shock hazard to people and animals present on the surface of roadway 114. However, on the other hand, it may be beneficial that the protective later have conductive properties allowing electrical energy to be conducted from embedded conductor 116 to vehicle 100, to increase transfer of energy between embedded conductor 116 and vehicle 100. In order to provide desired safety, while allowing for conduction of electrical energy between embedded conductor 116 and vehicle 100, layer 268 may be formed with a system and/or material allowing it to have dual-mode electrical characteristics such that a portion of it may conduct electrical energy from embedded conductor 116 when a vehicle 100 is proximate to such portion, and may not conduct electrical energy from embedded conductor 116 when a vehicle 100 is not proximate to such portion. Any suitable implementation of such dual-mode electrical characteristics may be employed. An example of a roadway 114 with such dual-mode characteristics is depicted in FIGS. 3A and 3B.

Figure 3A:
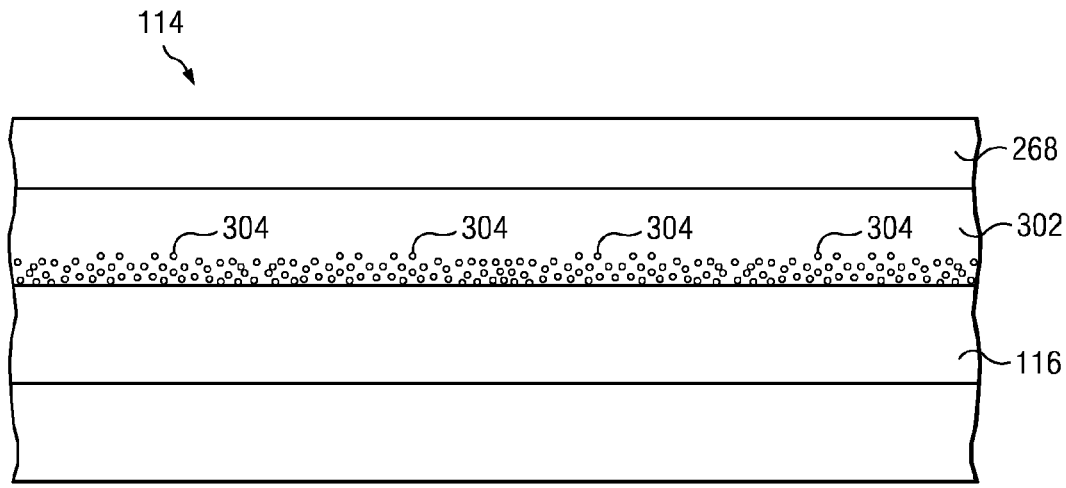
FIGS. 3A and 3B depict a cross-sectional elevation view of an example of one embodiment for providing dual-mode electrical characteristics for a surface of roadway.
Figure 3B:
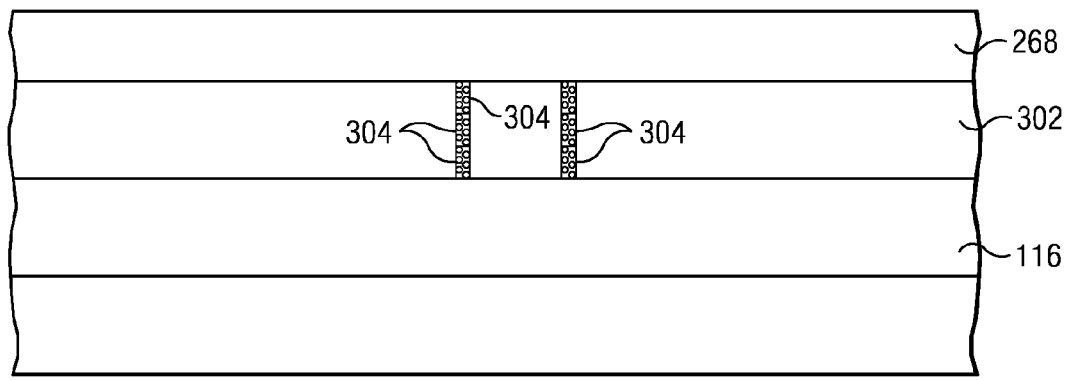

FIGS. 3A and 3B depict a cross-sectional elevation view of an example of one embodiment for providing dual-mode electrical characteristics for a surface of roadway 114, in accordance with embodiments of the present disclosure. As shown in FIGS. 3A and 3B, layer 268 may comprise a strip of electrically conductive material (e.g., aluminum, copper, etc.) placed upon a layer of electrically insulative material 302 (e.g., air), wherein such layer of electrically insulative layer is placed upon embedded conductor 116. In some embodiments, electrically insulative layer 302 may have magnetic properties and thus may include within it include particles of magnetic and electrically conductive material 304 (e.g., iron, iron silicide, and/or another ferromagnetic or ferrimagnetic material), such that in the presence of a magnetic field, particles 304 may form an electrically conductive path, as shown in FIG. 3B. FIGS. 3A and 3B depicts a cross-sectional elevation view of an example of such embodiments. Accordingly, in the absence of a magnetic field, particles 304 may collect (e.g., due to gravity) the bottom of electrically insulative layer 302, as shown in FIG. 3A. On the other hand, in the presence of a magnetic field, particles 304 may form one or more conductive paths between embedded conductor 116 and layer 268. The magnetic field inducing alignment of particles 104 in a particular portion of roadway 114 to form one or more conductive paths may be present when a vehicle 100 is proximate to such particular portion. For example, wheel assembly 104 of a vehicle may include a permanent magnet and/or electrical components for producing an induced electromagnetic field capable of aligning particles 304 to complete a path between embedded conductor and layer 268 in portions of roadway 114, so that the surface of roadway 114 conducts electricity as wheel assembly 104 passes over or near such sections. As another example, as described below, each of individual segments of embedded conductor 116 may be configured to conduct electrical energy when a vehicle 100 is proximate (as determined by sensors present in roadway 114), and interrupt the flow of current when a vehicle 100 is not proximate to the segment. In such embodiments, the magnetic field induced by embedded conductor 116 while enabled in response to vehicle proximity may align particles 304 to complete a path between embedded conductor and layer 268.

In addition or alternatively to the embodiment depicted in FIGS. 3A and 3B, layer 268 may include one or more materials that have dual-mode properties in which they may behave as an electrical insulator, but experience a reduction in electrical resistance or behave as an electrical conductor in the present of magnetic and/or electrical fields. Examples of such dual-mode materials may include, without limitation, topological insulator nano-ribbon and cross-correlated manganese oxide exhibiting a magnetoresistance effect. Layer 268 comprising such dual-mode material may be placed over embedded conductor 116. In embodiments in which energy is transferred between roadway 114 and wheel assembly via electric conduction, wheel assembly 104 may, as described above, provide a magnetic field such that portions of layer 268 may change from insulative to conductive in presence of the magnetic field, thus allowing such portions to conduct electrical energy to wheel assembly 104 as wheel assembly 104 passes over or near such portions of layer 268.

In some embodiments, embedded conductor 116 may be divided into multiple, individually powered segments 272, as depicted in FIG. 2D. Also as shown in FIG. 2D, roadway 114 may also have installed therein control units 276 associated with each segment 272, and conductors 274 coupled from a source of electrical energy (e.g., a publicly available power source) to corresponding segments 272 and control units 276. Conductors 274 may be disposed under the surface of roadway 114 and may comprise any suitable wire, cable, or strip of conductive material configured to conduct electrical energy from a source of electrical energy (e.g., a publically available power source in the form of overhead or underground transmission lines) to a corresponding segment 272 and control unit 276.

Figure 4:
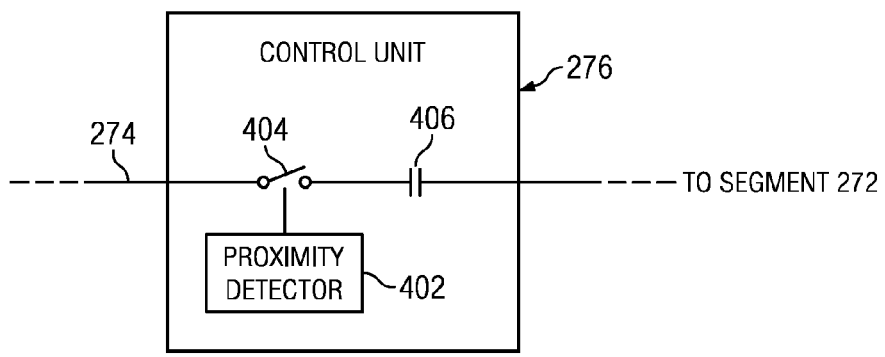
FIG. 4 depicts a block diagram of an example control unit, in accordance with embodiments of the present disclosure.

A control unit 276 may be electrically coupled to one or more corresponding conductors 274 and one or more corresponding segments 272, and may include any system, device, or apparatus configured to switch one or more corresponding segments 272 between powered states (e.g., powered or unpowered). FIG. 4 depicts a block diagram of an example control unit 276, in accordance with embodiments of the present disclosure. As shown in FIG. 4, control unit 276 may include a proximity detector 402, a switch 404, and a tuning capacitor 406. Proximity detector 402 may include any system, device, or apparatus configured to detect proximity of a vehicle 100 enabled to receive inductive or conductive electrical energy from embedded conductor 116. For example, in some embodiments, proximity detector 402 may include a radio frequency identification (RFID) receiver configured to receive one or more signals from one or more RFID transmitters disposed in a vehicle 100. As a specific example, in one embodiment a single RFID transmitter may be disposed in certain vehicles 100, and proximity detector 402 may detect the presence of a vehicle 100 by receiving appropriate signals from the single RFID transmitter. As another specific example, in another embodiment, two RFID transmitters may be disposed at opposite ends (e.g., front and rear) of certain vehicles 100, and proximity detector 402 may detect signals from the first RFID transmitter to indicate a vehicle 100 becoming proximate to a segment 272, and detect signals from the second RFID transmitter to indicate the same vehicle leaving proximity of the segment 272. In addition to RFID proximity sensing, proximity sensor 402 may utilize any other suitable detection approach, including optical, electrical, magnetic, acoustical (e.g., Doppler effect), and/or others.

Switch 404 may include any system, device, or apparatus configured to alternatively break an electrical circuit (thus interrupting the current flowing in the circuit) and complete an electrical circuit (thus allowing for current to flow in the circuit), based on a control signal received from proximity detector 402. In some embodiments, switch 404 may be implemented by one or more transistors in a transmission gate configuration. Accordingly, during operation, when a vehicle 100 is proximate to control unit 276, proximity detector 402 may detect such proximity and cause switch 404 to close, such that electrical current flows into a segment 272 corresponding to the control unit. Conversely, when proximity detector 402 does not detect proximity of a vehicle 100, it may cause switch 404 to open, such that flow if electrical current is interrupted to the corresponding segment. Thus, to conserve energy, segments 272 of embedded conductor 116 may each remain in an unpowered state until such time as proximity sensor 402 within a control unit 272 corresponding to a particular segment 272 detects a vehicle 100, at which point the particular segment 272 may power on to provide energy to vehicle 100 in the form of induction and/or conduction.

Control unit 276 may also include one or more tuning capacitors 406 configured to be, when switch 404 is closed, in series with a coil 262 of a segment 272 corresponding to control unit 276. Accordingly, tuning capacitor 406 may provide tuning such that the capacitance of tuning capacitor 406 and the inductance of the corresponding coil 262 generate an inductive-capacitance resonance. Such resonance may be beneficial for inductive powering of a vehicle 100, as the presence of tuning capacitor 406 may tune the frequency of an electromagnetic wave in coil 262 to a desired frequency and/or minimizing an impedance at a particular frequency (e.g., a resonance frequency).

Turning again to FIG. 2D, roadway 114 may also include one or more solar power generators 280, thermoelectric power generators 282, piezoelectric power generators 284, and/or other "alternative" energy power generators. As shown in FIG. 2D, one or more of solar power generator 280, thermoelectric power generator 282, and piezeoelectric power generator 284 may be electrically coupled to one or more segments 272 of embedded conductor 116 (e.g., via conductors 274) such that electrical energy generated by one or more of solar power generator 280, thermoelectric power generator 282, and piezeoelectric power generator 284 may be transferred to embedded conductor 116, so as to provide electrical energy for induction and/or conduction of electrical energy from embedded conductor to vehicle 100. A solar power generator 280 may include any system, device, or apparatus configured to convert photonic energy (e.g., from the sun and/or vehicle headlights) received by or otherwise impinging solar power generator 280 into electrical energy in the form of an electrical current. For example, in some embodiments solar power generator 280 may include a photovoltaic panel, film, and/or paint placed upon the surface of roadway 114. For example, in the case of a film and/or paint, a two-layer solar cell made of light-absorbing nanoparticles known as quantum dots may be applied to roadway 114 in order to produce solar power generator 280. Such quantum dots may be tuned to absorb different parts of the solar spectrum by varying their size. In these and other embodiments, solar power generator 280 may also include any system, device, or apparatus configured to convert a magnetic field present in photonic energy into electrical energy using optically-induced charge separation and terahertz emission in unbiased dielectrics. In such embodiments, the magnetic field of photonic energy may, in certain materials, affect electron motion in certain materials such that a magnetic dipole is created in the material. By suitably aligning the dipoles in a substantially long fiber, strip, or strand of material, and placing such fiber, strip, or strand on a surface of roadway 114, the fiber, strip, or strand of material may generate a substantial electrical potential to provide electrical energy to embedded conductor 116.

A thermoelectric power generator 282 may be embedded within roadway 114 as shown in FIG. 2D, and may include any system, device, or apparatus configured to convert, using the thermoelectric effect known in the art, thermal energy present in portions roadway 114 proximate to thermoelectric power generator 282 into electrical energy in the form of an electrical current. Thermoelectrical power generator 282 may include any suitable material capable of generating electrical current in accordance with the thermoelectric effect, including, without limitation: materials composed of tellurium, antimony, germanium, and silver (TAGS) (including TAGS doped with cerium or ytterbium); skutterudites; and/or lead telluride having nanocrystals of rock salt (SeTe) placed therein.

A piezoelectric power generator 284 may be embedded within roadway 114 as shown in FIG. 2D, and may include any system, device, or apparatus configured to convert vibrational energy present in roadway 114 (e.g., caused by motion of vehicles on roadway 114) into electrical energy in the form of current.

Electrical energy generated by solar power generator 280, thermoelectric power generator 282, and/or piezeoelectric power generator 284 may be, in some embodiments, delivered to embedded conductor 116 in the form of an electrical current, such that the electrical current may transfer energy to a vehicle 100 via induction or conduction. In addition or alternatively, electrical energy generated by solar power generator 280, thermoelectric power generator 282, and/or piezeoelectric power generator 284 may be, in some embodiments, delivered to a public provider of electrical energy (e.g., via a publicly available electrical energy distribution grid) and/or one or more other destinations such that such electrical energy is ultimately consumed by an entity other than vehicles 100 traveling on roadway 114.

As shown in FIGS. 2A-2C, wheel assembly 104 may include one or more coils 212 of conductive material (e.g., wire constructed from copper, aluminum, or other conductive material) each wrapped (e.g., in loops or turns) about a magnetic core 214 of ferromagnetic or ferrimagnetic material (e.g., iron, ferrite, iron silicide, etc.). For example, in the example embodiment shown in FIGS. 2A-2C, wheel assembly 104 includes 12 coils 212 each wrapped about magnetic core 214. Each end of each coil 212 may be electrically coupled to a segment of a segmented-ring commutator 218. In the embodiment depicted in FIGS. 2A-2C, one end of each coil 212 may be in contact with a segment 219 of a first commutator 218 while the other end of each coil is in contact with a segment 219 of second commutator placed opposite to the first commutator 218 within wheel assembly 104. Wheel assembly 104 may include a holder 216 configured to mechanically and electrically coupled coils to commutator 218 using appropriate bolts, screws, and/or other fasteners.

Wheel assembly 104 may also include tire 220. Tire 220 may comprise any circular-shaped covering (e.g., a rubber tire) that fits around other components of wheel assembly 104 (e.g., coils 212) protect other components of wheel assembly 104 and provide a flexible cushion that absorbs shock while maintaining contact with a roadway (e.g., roadway 114). In embodiments in which energy is transferred from roadway 114 to wheel assembly 104 via electric conduction, tire 220 may be formed of one or more materials having electrically conductive properties, while still having mechanical elasticity (e.g., an elastic polymer having electrically conductive properties), thus allowing tire 220 to conduct electrical energy from a surface of roadway 114 to energy storage device 122 and/or drive system 124 (as described in greater detail below) while maintaining elasticity comparable to that of a traditional rubber tire.

In some embodiments (not explicitly shown), wheel assembly 104 may, instead of being implemented as a wheel separate from those wheels of vehicle 100 intended to provide drive and/or steering to the vehicle (e.g., the standard, traditional four tires of a conventional highway vehicle), wheel assembly 104 may be implemented as or part of one or more wheels of vehicle 100 that provide drive and/or steering to vehicle 100.

In addition to other components described above, powering assembly 102 may include one or more brushes 220, brush holders 224, brush holder brackets 222, fasteners 226, 228, magnetic sensors 204, worm gears 244, and bearings 208. Brushes 220 may comprise electrically conductive material (e.g., copper, aluminum, carbon, etc.) and may be configured to permit conduction of magnetically-induced current and electrically conducted current in coils 212 from segments of commutator 218 to other components of vehicle 100 (e.g., energy storage device 122 and/or drive system 124). During operation of powering assembly 102, it may be desirable that brushes 220 remain in physical contact with commutator 218, to ensure electrical conductivity between coils 212 and other components of vehicle 100. Accordingly, each brush 220 may be mechanically coupled to a brush holder 224 configured to cause its corresponding brush 220 to maintain in contact with commutator 218. Brush holders 224 may be maintained in place by one or more brush holder brackets 222 and fasteners 226 and 228. A fastener 226, 228 may include any suitable bearing, bolt, and/or other fastener. A bracket 222 may be any structural member configured to, in connection with fasteners 226, 228 maintain brush holders 224 and/or brushes 220 at a desired position relative to other components of powering assembly 102.

Magnetic sensor 204 may be mechanically mounted to axle 106 or any other suitable component of powering assembly 102 and may include any system, device, or apparatus configured to sense the presence and intensity of a magnetic field (e.g., a magnetic field generated by embedded conductor 116). Magnetic sensor 204 may be implemented as a Hall effect sensor or any other suitable type of sensor. Magnetic sensor 204 may be electrically coupled to motor 217, such that magnetic sensor 204 may communicate a signal to motor 217 indicative of the intensity of a detected magnetic field.

Motor 217 may be mechanically coupled to wheel assembly 104 via worm gear 244 and, based on signals received from magnetic sensor 204 indicative of a magnetic field intensity, motor 217 may engage with worm gear 244 so as to cause wheel assembly 104 to move in a lateral direction along axle 106 (e.g., in a direction parallel to the axis of axle 106). Such movement may be performed in order to align wheel assembly 104 with embedded conductor 116, in order to cause wheel assembly 104 to rotate in a position where magnetic field strength produced by embedded conductor 116 is the greatest. In some embodiments, lateral translation of wheel assembly 104 by motor 217 and worm gear 244 may be limited by bearings 208 mechanically coupled to axle 108.

In these and other embodiments, magnetic sensor 204 may also sense the presence of intensity of a magnetic field so as to determine whether vehicle 100 is on or near a roadway (e.g., roadway 114) having an embedded conductor 116 capable of generating inductive or conductive electrical energy. Accordingly, in such embodiments, one or more arms 108 and/or other components of vehicle 100 may be configured to, after detecting a magnetic field of minimum intensity by magnetic sensor 204, lower wheel assembly 104 so that tire 220 of wheel assembly makes frictional contact with roadway 114. In addition or alternatively, after detecting a magnetic field of minimum intensity by magnetic sensor 204, magnetic sensor 204 may communicate a signal to an operator of vehicle 100 (e.g., via control system 126) indicating proximity to an energized roadway 114, and such operator may (e.g., via a user interface in the cabin of vehicle 100) cause wheel assembly 104 to lower. Once lowered, magnetic sensor 204, in connection with motor 217 and worm gear 244, laterally translate wheel assembly 104 such that wheel assembly 104 remains proximate to embedded conductor 116. Upon leaving an energized roadway 114, one or more arms 108 and/or other components of vehicle 100 may be configured to, after detecting a magnetic field intensity below a minimum intensity by magnetic sensor 204, raise wheel assembly 104 from the surface roadway 114. In addition or alternatively, after detecting a magnetic field below a minimum intensity by magnetic sensor 204, magnetic sensor 204 may communicate a signal to an operator of vehicle 100 (e.g., via control system 126) indicating vehicle is no longer in proximity to an energized roadway 114, and such operator may (e.g., via a user interface in the cabin of vehicle 100) cause wheel assembly 104 to raise.

In some embodiments, magnetic sensor 204 may also communicate one or more signals to control system 126 and/or an operator of vehicle 100 indicating that, based on the position of magnetic sensor 204 relative to embedded conductor 116, vehicle 100 may be in danger of leaving roadway 114 and/or a current lane of travel of vehicle 100. Such a situation may occur is an operator is falling asleep, has his/her attention diverted from the road, and/or is otherwise failing to maintain a vehicle 100 on roadway 114 or the present lane of travel. Thus, in response, an operator may manually respond to the alert by correcting (e.g., via a steering wheel in the cabin of vehicle 100) the detected deviation and/or control system 126 may automatically communicate signals to drive system 124 and/or other components of vehicle 100 to steer and/or alter the velocity of vehicle 100 in order to correct the detected deviation. Thus, magnetic sensor 204, control system 126, and/or other components of vehicle 100 may operate in concert to reduce the occurrence of vehicular accidents.

In operation, wheel assembly 104 may rotate about axle 108 due to friction of tire 220 against roadway 114 while vehicle 100 is in motion. As wheel assembly 114 passes across the surface of roadway 114, coils 212 may intersect perpendicularly with imaginary field lines of magnetic flux generated by embedded conductor 116, thereby inducing an electrical current at each end of coils 212. The induced electric current in coils 212 may be conducted to other components of vehicle 100 (e.g., via commutator 218, brushes 220, etc.) in order to recharge energy storage device 122, power drive system 124 of vehicle 100, and/or power other components of vehicle 100.

Although FIGS. 1 and 2A-2D depict only a single induction wheel assembly 104 for inductive powering of vehicle 100, in some embodiments, a vehicle 100 may include more than one induction wheel assembly 104. Although FIGS. 2A-2D depict inductive powering of a vehicle via induction wheel assembly 104, in some embodiments induction powering assembly 102 may include other components for inductive transfer of energy from embedded conductor 116 to vehicle 100. For example, induction powering assembly 102 may include a rod of ferromagnetic material wound with conductive material and configured to act as a secondary coil for transferring electrical energy from embedded conductor 116 via induction. Such rod of conductive material may be carried by an induction wheel assembly or other suitable mode of carriage.

In addition or alternatively to receiving energy via induction from embedded conductor 116, wheel assembly 104 may receive energy via conduction from embedded conductor 116. In embodiments supporting conduction from embedded conductor 116 via wheel assembly 104, wheel assembly 104 may include a tire 220 or covering having electrically conductive properties, thereby allowing conduction of electrical energy from a surface of the tire 220 or other covering to conductive components of wheel assembly 104 (e.g., commutator 218, brushes 220). Also as described above, layer 268 above embedded conductor 116 may, in some embodiments, be configured such that portions of layer 268 conduct electrical energy from embedded conductor 116 to wheel assembly 104 as wheel assembly 104 passes over or near such sections. Thus, electrical energy may be conducted from embedded conductor 116 to wheel assembly 104 and conducted from wheel assembly 104 to other components of vehicle 100 (e.g., via commutator 218, brushes 220, etc.) in order to recharge energy storage device 122, power drive system 124 of vehicle 100, and/or power other components of vehicle 100.

In certain embodiments, conducive materials present in vehicle 100 and roadway 114 (e.g., coils 212, tires 220, embedded conductor 116, conductors 272, etc.), may be configured to transmit communication signals, in addition to transmission of electrical energy for powering of vehicles 100. For example, communications packets or frames (generally referred to herein as "datagrams") of any suitable communication standard or protocol may be multiplexed into conductors 272 in accordance with any approach that may be presently or in the future known. Thus, a control system 126 of a first vehicle 100 may be capable of generating and transmitting (e.g., via tire 220 and/or other electrically conductive components) signals to embedded conductor 116. Embedded conductor 116 may further communicate such signals to a second vehicle 100 (e.g., via tire 220 and/or other conductive components of the second vehicle 100) and/or another destination (e.g., via conductors 272). In addition or alternatively, vehicles 100 may also receive signals communicated from a source other than another vehicle 100 (e.g., via conductors 272). Such communication of signals may have many numerous applications. For example, signals communicated between vehicles 100 may serve to alert control systems 126 of vehicles as to the proximity of vehicles 100 to each other, so as to avoid collisions or permit the introduction of autonomous or "driverless" cars that are able to safely travel over roadways without collisions based on signals communicated between vehicles 100 indicative of the proximity of vehicles to each other. As another example, vehicles 100 may transmit information to a remote computing device, which may record such information in order to meter use of a roadway 114 (e.g., for the purposes of collecting tolls or use-based taxes for use of roadway 114), study traffic density and/or congestion, and/or for other suitable uses. As a further example, vehicles may receive information from a remote computing device which may be displayed to an operator via a user interface in the cabin of vehicle 100, wherein the user interface may display information regarding traffic congestion, roadway construction, detours, navigation and/or map information (e.g., similar to that displayed in traditional GPS navigation devices), and/or other suitable information.

Figure 5:
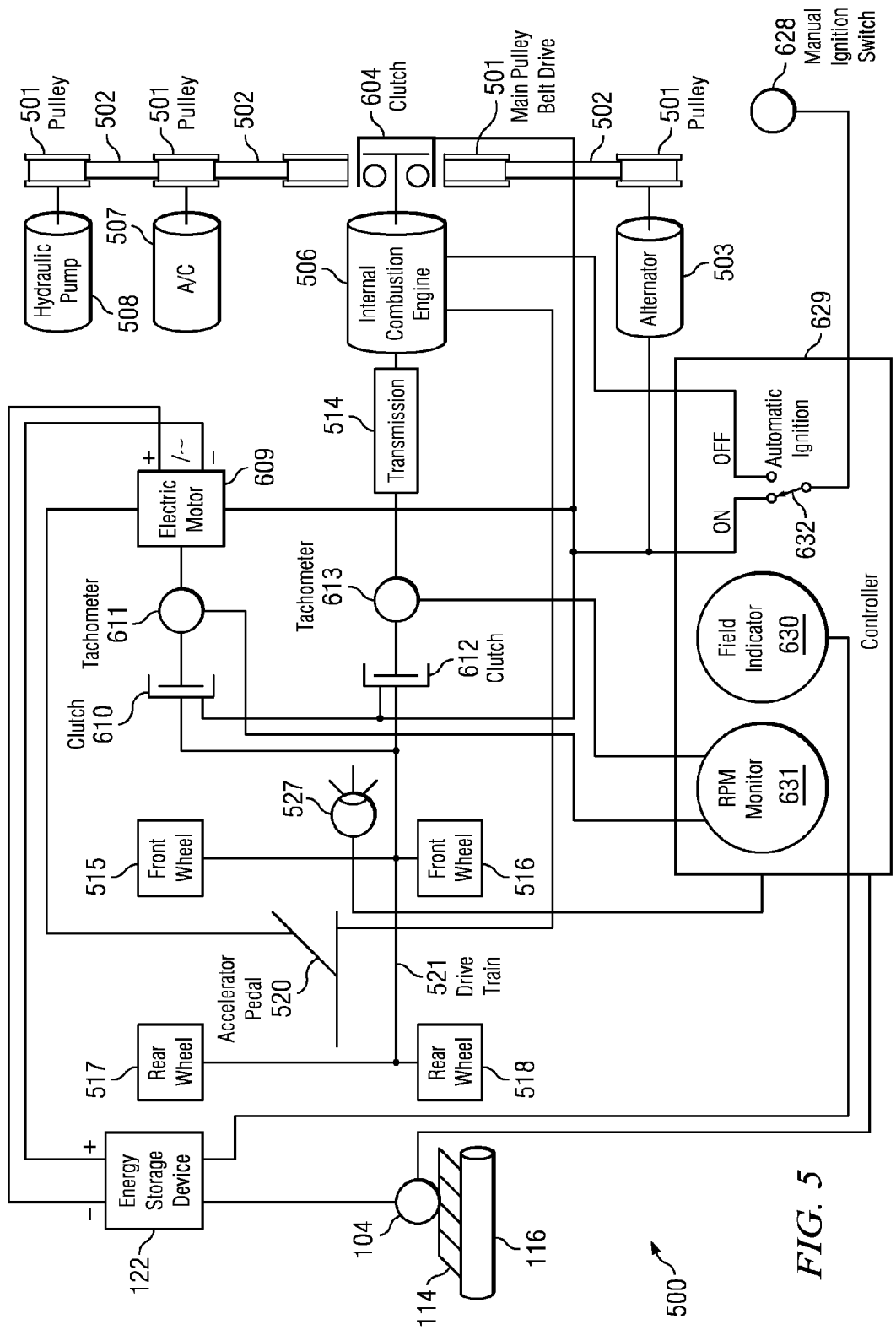
FIG. 5 depicts a block diagram of a conventional gasoline-powered vehicle adapted with a conversion kit to allow for powering of the vehicle via a roadway-embedded conductor, in accordance with embodiments of the present disclosure.

FIG. 5 depicts a block diagram of a conventional gasoline-powered vehicle 500 adapted with a conversion kit to allow for powering of the vehicle via a roadway-embedded conductor, in accordance with embodiments of the present disclosure. As is known in the art, a conventional gasoline-powered vehicle may include a number of components, including without limitation, one or more pulleys 501, one or more belts 502, an alternator 503, one or more belt drives 505, an internal combustion engine 506, an air conditioning system 507, a hydraulic pump 508, a transmission 514, wheels 515-518, an accelerator pedal 520, a drive train 521, and one or more lights 527. Because the characteristics and functionality of such components are well known in the art, their characteristics and functionality are not set forth in detail in this disclosure. For purposes of clarity and exposition, components in FIG. 5 traditionally found in a conventional combustion engine vehicle have been assigned reference numerals beginning with the numeral 5.

A conversion kit may include any system, device, or apparatus configured to convert an existing conventional combustion engine vehicle into a gas-electrical hybrid vehicle in which electrical energy used to power the vehicle is received, at least in part, by induction and/or conduction from a roadway-embedded conductor (e.g., embedded conductor 116 in roadway 114) via a powering assembly having a wheel assembly (e.g., wheel assembly 104 of powering assembly 102). As shown in FIG. 5, the conversion kit may include wheel assembly 104, energy storage device 122, clutches 604, 610, 612, tachometers 611, 613, electric motor 609, manual ignition switch 628, and controller 629. For purposes of clarity and exposition, components in FIG. 5 comprising the conversion kit (other than wheel assembly 104 and energy storage device 122) have been assigned reference numerals beginning with the numeral 6.

Electric motor 609 may be coupled to energy storage device 122, accelerator pedal 520, controller 529, tachometer 611, clutch 610, and/or one or more other components of vehicle 500. Electric motor 609 may be any system, device, or apparatus configured to convert electrical energy (e.g., stored in energy storage device 122) to mechanical energy for driving drive train 521, wheels 515-518 and/or other components of vehicle 500. In some embodiments, electric motor 609 may be installed proximate to drive train 521, parallel to the existent transmission 514.

Clutches 604, 610, and 612 may each include any system, device, or apparatus configured to transmit mechanical power from one component (e.g., a motor) to another (e.g., a drive train). In some embodiments, one or more of clutches 604, 610, and 612 may comprise an electromagnetic clutch. As shown in FIG. 5, electromagnetic clutch 610 may be coupled between electric motor 609 and drive train 521, and electromagnetic clutch 612 may be coupled between transmission 514 and drive train 521. Clutches 610 and 612 may be configured to operate in tandem such that when clutch 610 is engaged, clutch 612 is disengaged, and vice versa. Accordingly, when electric motor 609 is engaged in fraction of vehicle 500 via drive train 521 and wheels 515-518, clutch 612 may disengage internal combustion engine 506, and vice versa.

Clutch 604 may be mounted on or near a main pulley shaft of internal combustion engine 506, and may be configured to disengage pulley drive 505 from internal combustion engine 506 when electric motor 609 is engaged with and internal combustion engine 506 is disengaged from drive train 521, rendering pulley drive 505 in a free motion state. In addition, clutch 604 may be configured to engage pulley drive 505 when combustion engine 506 is engaged with drive train 521. Substantially contemporaneously with the engaging of electric motor 609 with and disengaging of internal combustion engine 506 from drive train 521, alternator 503 may assume the function of an electric motor (e.g., powered from energy storage device 122 and/or induction powering assembly 102) to drive belt 502 to generate functionality of auxiliary equipment including air conditioning system 507, hydraulic pump 508, and/or other components.

As shown in FIG. 5, accelerator pedal 520 may be communicatively coupled to electric motor 609, such that depression of accelerator pedal 520 may regulate the speed of electric motor 609, and accordingly, speed of vehicle 500.

In addition, as shown in FIG. 5, electric motor 609 may be coupled to and may receive electrical energy in the form of an electric current from energy storage device 122. As described in greater detail above, energy storage device 122 may be charged via electrical energy received by conduction and/or induction via wheel assembly 104 from embedded conductor 116. Although not explicitly shown in FIG. 5, in some embodiments electric motor 609 may receive electrical energy directly from wheel assembly 104.

Tachometers 611 and 613 may be mounted respectively to the shaft of internal combustion engine 506 and the shaft of electric motor 609. Tachometer 611 may be configured to monitor the angular speed of electric motor 609 such that, when vehicle 500 is switched from electric-powered to gasoline-powered mode, internal combustion engine 506 may adjust its angular speed based on the angular speed measured by tachometer 611. Similarly, tachometer 613 may be configured to monitor the angular speed of internal combustion engine 506 such that, when vehicle 500 is switched from gasoline-powered to electric-powered mode, electric motor 609 may adjust its angular speed based on the angular speed measured by tachometer 613.

Controller 629 may be any system, device, or apparatus generally configured to receive information from one or more sensors (e.g., tachometers 611, 613, magnetic sensor 204, etc.) and/or control operation of one or more components of vehicle 500. For example, controller 629 may include an RPM monitor 631 configured to receive signals from tachometers 611, 613 indicative of motor speed of electric motor 609 and/or internal combustion engine 506 in order to properly adjust angular speeds of either when switching from one mode of operation to another (e.g., gasoline-powered to electric-powered mode, or vice versa). As another example, controller 629 may include a field indicator 630 configured to receive a signal from magnetic sensor 204 indicative of proximity of induction wheel assembly 104 to an embedded conductor 116 and based on the signal, switch between gasoline-powered mode and electric-powered mode (or vice versa) by actuating automatic ignition switch 632, and/or control alignment of induction wheel assembly with embedded conductor 116 by communicating appropriate control signals to a motor (e.g., motor 217) or induction wheel assembly 104. As further example, controller 629 may monitor vital parameters of energy storage device 122 or other components of vehicle 500.

A conversion kit may also include manual ignition switch 628, allowing an operator of vehicle 500 to select between gasoline-powered mode and electric-powered mode.

While a particular arrangement of components is depicted in FIG. 5, various components of vehicle 500, including the conversion kit, may be arranged in any suitable manner. For example, in some embodiments, despite that electric motor 609 is shown as coupled to drive train 521 via clutch 610, electric motor 609 may in some embodiments (e.g., those in which electric motor 609 is a multi-speed motor) be placed "before" transmission 514, with clutches or other control mechanisms configured to select between electric motor 609 and internal combustion engine 506 for engaging transmission 514.

Based on the foregoing, powering assembly 102 may provide improved systems and methods for electrical powering of vehicles. Modifications, additions, or omissions may be made to vehicle 100 and powering assembly 102 without departing from the scope of the present disclosure.

What is claimed is:

1. A method for adapting a conventional gasoline-powered vehicle to permit the vehicle to be powered via a roadway-embedded conductor comprising:
   mechanically coupling a first clutch between an internal combustion engine of the vehicle and a drive train of the vehicle, the first clutch configured to engage the internal combustion engine with the drive train during a first mode of operation and disengage the internal combustion engine from the drive train during a second mode of operation;
   mechanically coupling a second clutch to the drive train;
   mechanically coupling an electric motor to the second clutch, the second clutch configured to engage the electric motor with the drive train during the second mode of operation and disengage the electric motor from the drive train during the first mode of operation; and electrically coupling the electric motor to at least one of:

a powering assembly configured to transfer at least a portion of electrical energy from a roadway-embedded conductor, the electrical energy in the form of at least one of a magnetically-induced electric current and an electrically-conducted current; and an energy storage device configured to convert at least a portion of the electrical energy transferred by the powering assembly into stored potential energy.

2. A method according to claim 1, further comprising mechanically coupling a third clutch between the internal combustion engine and a pulley drive, the third clutch configured to engage the internal combustion engine with the pulley during the first mode of operation and disengage the internal combustion engine from the drive train during the second mode of operation.

3. A method according to claim 2, wherein the pulley drive is configured to transfer energy from the internal combustion engine to one or more components of the vehicle.

4. A method according to claim 1, wherein at least one of the first clutch and the second clutch comprises an electromagnetic clutch.

5. A method according to claim 1, further comprising:

coupling a first tachometer to the internal combustion engine, the first tachometer configured to measure a first angular speed of the internal combustion engine;

coupling a second tachometer to the electric motor, the second tachometer configured to measure a second angular speed of the electric motor; and communicatively coupling a controller to the first tachometer, the second tachometer, the internal combustion engine, and the electric motor, the controller configured to:

when transitioning between the first mode of operation to the second mode of operation, cause the angular speed of the electric motor to approximately equal the first angular speed; and when transitioning between the second mode of operation to the first mode of operation, cause the angular speed of the internal combustion engine to approximately equal the second angular speed.

6. A system for adapting a conventional gasoline-powered vehicle to permit the vehicle to be powered via a roadway-embedded conductor comprising:

a powering assembly configured to transfer electrical energy from a roadway-embedded conductor, the electrical energy in the form of at least one of a magnetically-induced electric current and an electrically-conducted current;

an electric motor configured to be powered by at least one of a portion of the electrical energy transferred by the powering assembly and stored potential energy converted from at least a portion of the electrical energy transferred by the powering assembly;

a first clutch configured to be mechanically coupled to an internal combustion engine of the vehicle and a drive train of the vehicle, the first clutch further configured to engage the internal combustion engine with the drive train during a first mode of operation and disengage the internal combustion engine from the drive train during a second mode of operation; and a second clutch configured to be mechanically coupled to the electric motor, the second clutch further configured to engage the electric motor with the drive train during the second mode of operation and disengage the electric motor from the drive train during the first mode of operation.

7. A system according to claim 6, further comprising an energy storage device electrically coupled to the powering assembly and the electric motor, the energy storage device configured to:

convert at least a portion of electrical energy transferred by the powering assembly to stored potential energy; and convert stored potential energy into electrical energy for powering the electric motor.

8. A system according to claim 6, further comprising a third clutch configured to be mechanically coupled between the internal combustion engine and a pulley drive, the third clutch further configured to engage the internal combustion engine with the pulley during the first mode of operation and disengage the internal combustion engine from the drive train during the second mode of operation.

9. A system according to claim 8, wherein the pulley drive is configured to transfer energy from the internal combustion engine to one or more components of the vehicle.

10. A system according to claim 6, wherein at least one of the first clutch and the second clutch comprises an electromagnetic clutch.

11. A system according to claim 6, further comprising:

a first tachometer configured to be coupled to the internal combustion engine, the first tachometer further configured to measure a first angular speed of the internal combustion engine;

a second tachometer configured to be coupled to the electric motor, the second tachometer further configured to measure a second angular speed of the electric motor; and a controller communicatively coupled to the first tachometer, the second tachometer, the internal combustion engine, and the electric motor, the controller configured to:

when transitioning between the first mode of operation to the second mode of operation, cause the angular speed of the electric motor to approximately equal the first angular speed; and when transitioning between the second mode of operation to the first mode of operation, cause the angular speed of the internal combustion engine to approximately equal the second angular speed.

\* \* \* \* \*